US007158929B2

(12) United States Patent

Wouters et al.

(10) Patent No.: US 7,158,929 B2

(45) Date of Patent: Jan. 2, 2007

(54) METHOD OF PERSONALIZING AND IDENTIFYING COMMUNICATIONS

(75) Inventors: Marc-Henri J. M. A. Wouters, Brussels (BE); Frédéric A. J. Spaey, Linkebeek (BE); Ernst W. Meinrath, Brussels (BE); Stuart J. West, Walnut Creek, CA (US)

(73) Assignee: Trust Media Technology, S.P.R.L., Brussels (BE)

( * ) Notice: Subject to any disclaimer, the term of this patent is extended or adjusted under 35 U.S.C. 154(b) by 716 days.

(21) Appl. No.: 10/359,991

(22) Filed: Feb. 7, 2003

(65) Prior Publication Data

Related U.S. Application Data

(60) Provisional application No. 60/355,264, filed on Feb. 8, 2002.

(51) Int. Cl.
*G06F 9/455* (2006.01)

(52) U.S. Cl. .......................................... 703/24; 386/94

(58) Field of Classification Search .................. 703/24, 703/23; 705/57; 369/53.21; 386/94
See application file for complete search history.

(56) References Cited

U.S. PATENT DOCUMENTS

| | | | | |
|---|---|---|---|---|
| 5,260,999 | A | 11/1993 | Wyman | 384/4 |
| 5,629,980 | A | 5/1997 | Stefik | 380/4 |
| 5,792,971 | A | 8/1998 | Timis et al. | 84/609 |
| 5,915,019 | A | 6/1999 | Ginter | 380/4 |
| 5,918,223 | A | 6/1999 | Blum et al. | 707/1 |
| 5,952,598 | A | 9/1999 | Goede | 84/609 |
| 6,051,770 | A | 4/2000 | Milburn et al. | 84/611 |
| 6,208,598 | B1 * | 3/2001 | Sinquin et al. | 369/47.12 |
| 6,768,709 | B1 * | 7/2004 | Carson et al. | 369/53.21 |
| 6,826,352 | B1 * | 11/2004 | Quan | 386/94 |
| 6,944,621 | B1 * | 9/2005 | Collart | 707/102 |
| 6,952,685 | B1 * | 10/2005 | Hunter et al. | 705/58 |

OTHER PUBLICATIONS

Audible Magic Corporation, "Audio Identification Technology Provides the Cornerstone for Online Distribution," Audio Identification Technology Overview, 2000, pp. 1-3.

Audible Magic Corporation, "Audio Magic: Frequently Asked Questions," Rev. 6-2001, pp. 1-3.

Audible Magic Corporation, "Bibliography of Audio Identification Technology," 2001, 2 pp.

Audible Magic Corporation, "Audible Magic has the Solutions!" Audible Magic—Solutions for Broadcast Monitoring, http://www.audiblemagic.com/solutions/products.html, Jan. 22, 2002, pp. 1-3.

(Continued)

*Primary Examiner*—Albert W. Paladini
(74) *Attorney, Agent, or Firm*—Fliesler Meyer LLP

(57) ABSTRACT

What is disclosed is a method of creating and distributing works of art that takes advantage of the possibilities of duplication and distribution offered by modern computing and telecommunication, while preserving the rights of the authors. Unique versions of a work of art are generated from a source variable work of art such that each unique version is perceptibly different from all other unique versions of the work of art. Unique versions can then be distributed to specific users so that specific unique versions are associated with specific unique versions. In the event a unique version is improperly shared, the user associated with the improperly shared unique version can be identified.

20 Claims, 10 Drawing Sheets

OTHER PUBLICATIONS

Audible Magic Corporation, "Take Control: Monitoring Tracking Verification of Any Audio Content," Audible Magic—audio identification fingerprinting services, http://www.audiblemagic.com/index.html, Jan. 22, 2002, pp. 1-2.

Audible Magic Corporation, "The Audible Magic Advantage," Audible Magic—Solutions for identifying and tracking digital music, http://www.audiblemagic.com/solutions.html, Jan. 22, 2002, pp. 1-3.

Brassil, J., et al., "Electronic Marking and Identification Techniques to Discourage Document Copying," Proceedings of the Conference on Computer Communications, Toronto, Jun. 12-16, 1994, Los Alamitos, IEEE Comp. Soc. Press, U.S., vol. 3, Jun. 12, 1994, pp. 1278-1287.

Craver, Scott A., et al., "Reading Between the Lines: Lessons from the SDMI Challenge," Proceedings of the USENIX Security Symposium, Aug. 13, 2001, pp. 1-12.

Hartung, Frank, et al., "Digital Rights Management and Watermarking of Multimedia Content for M-Commerce Applications," IEEE Communications Magazine, vol. 38, No. 11, Nov. 2000, pp. 78-84.

Herre, Jürgen, "Robust Matching of Audio Material, An MPEG-7 Audio Functionality," Fraunhofer Institut for Integrated Circuits (IIS-A), Erlangen, Germany, Dr. Jürgen Herre, hrr@iis.fhg.de, Apr. 2001, pp. 1-9.

Kellan, Ann, "Whiz kid has 'fingerprints' all over new Napster," CNN.com, Jul. 5, 2001, http://www.cnn.com/2001/TECH/internet/07/05/napster.fingerprint/, pp. 1-3.

Kumar, Jay, "Recording Industry Taking Closer Look at Fingerprinting," marketplace.services, Jun. 26, 2001, Webnoize News-Jun. 26, 2001, http://news.webnoize.com/item.rs?ID-13468, pp. 1-4.

Marrans, Michael, "Opcode Studio Vision Pro 3.0," Keyboard Reports, Miller Freeman Publications, San Francisco, U.S., Feb. 22, 1996, No. 2, pp. 105-110, 112, 115-118.

Mi2N—Music Industry News Network, "Audible Magic and Eliberation Corporation Announce End-to-End Solution for Tracking Music Usage, Royalty Management," Tech New (Oct. 12, 2001), http://mi2n.com/press.php3?press_nb=28507, pp. 1-3.

MusicBrainz, "Welcome to MusicBrainz!" http://www.musicbrainz.org/, Jan. 22, 2002, pp. 1-2.

Relatable, "The Relatable Engine," http://www.relatable.com/tech/engine.html, Jan. 22, 2002, 1 p.

Relatable, "Relatable lets you discover new music by listening to what you like," http://www.relatable.com/tech/tech.html, Jan. 22, 2002, pp. 1-2.

Relatable, "Learn More About the Player," http://www.relatable.com/tech/player.html, Jan. 22, 2002, pp. 1-2.

Relatable, "Enabling Technologies for Digital Media Distribution," News from Relatable, Apr. 20, 2001, "Napster and Relatable Enter Into Agreement," http://www.relatable.com/, 1 p.

Relatable, "TRM™: Advanced Audio Fingerprinting from Relatable," http://www.relatable.com/tech/trm.html, Jan. 22, 2002, pp. 1-2.

Segal, David, "Finding Fingerprints" in Online Music, *Washington Post*, May 3, 2001, http://www.washtech.com/new/media/9489-1.html, pp. 1-5.

Stone, Adrianne, "Audible Magic—Primer for Music Professionals," Audible Magic Corporation, 2001, pp. 1-6.

Winer, Dave, "CNN drops the link," DaveNet, Aug. 25, 2000, http://davenet.userland.coim/2000/08/25/cnnDropsTheLink, pp. 1-3.

Wold, Erling, et al., "Content-Based Classification, Search, and Retrieval of Audio," Muscle Fish, a division of Audible Magic, IEEE Multimedia, vol. 3, No., 3: Fall 1996, http://www.audiblemagic.com/solutions/ieee-1.htm, pp. 1-17.

* cited by examiner

[311] [312] [313] [314] [315]

| Attributes | Values | Values | Values | Values |
|---|---|---|---|---|
| Starttime | 13.2 | 13.2 | 13.2 | 13.2 |
| Length | 1.2 | 1.0 | 1.1 | 1.3 |
| Sustain | False | True | True | False |

[316]

Fixed

Variable

</artwork></figure><figure>

</artwork></figure><figure>
<artwork>

METHOD OF PERSONALIZING AND IDENTIFYING COMMUNICATIONS

CLAIM OF PRIORITY

This application claims priority from U.S. provisional patent application "METHOD OF GENERATING UNIQUELY IDENTIFIABLE WORKS OF ART," Application No. 60/355,264, filed Feb. 8, 2002, incorporated herein by reference.

BACKGROUND OF THE INVENTION

1. Field of the Invention

The present invention relates to a computer software application and system for creating and distributing digital works of art.

2. Description of the Related Art

The era of digital media is changing the way original content is created, used and distributed. Because of its nature, digital content can be copied any number of times, without its quality being substantially effected. For example, a digital version of a song can easily be extracted from the original CD, copied and compressed on a user's hard disk and/or published on the Internet through readily available peer-to-peer software applications, such as Napster and Kazaa. Using such peer-to-peer software applications, anybody with the appropriate equipment can download and listen to songs, with the same or near-same sound quality as contained on the original CD.

A large part of the media industry's current success is based on the duplication and selling of large quantities of unique works of arts. Millions of copies of a single original version are made and sold. With the proliferation of computing and networking, content creators and owners of digital products like music, movies, software and the like are facing critical piracy problems. Currently, the music and the software industries are being particularly impacted by piracy. Despite the fact that digital products have never been distributed in larger quantities than today, revenues are decreasing. This is at least in part due to an increasing number of products being illegally copied and distributed. In order to protect revenues, the media industry is trying to stop or at least limit illegal copying of their products.

Multiple solutions to arrest piracy problem have already been attempted.

One solution that attempts to solve the piracy problem is to encrypt content. In an encryption system, the content is encrypted before it is distributed to a user. The user can use the music, software, video or other media with a decoder. The decoder verifies the existence of a valid copyright for the product and, if the user is authorized, the content is decrypted and may be accessed.

Although an encryption system offers some protection, this kind of system can easily be bypassed. As an example for music and movies, because a user must hear and/or see the decrypted content, the user can always record the content from the digital or analog stream after the media has been decoded. In the case in which a user captures the analog signal, this is well known in the art as an "analog hole." After been recorded, the content can be freely distributed in any convenient format. Moreover, since typically a single encryption algorithm is used to encrypt the content, if any one person is able to 'crack' the algorithm, he or she can publish the method on the Internet, thus allowing anyone to make use of it.

Another attempted solution to the piracy problem is to embed a digital watermark (for example, a serial number) in the host content. Most commonly, digital watermarking is applied to media such as images, audio signals, and video signals. However, it may also be applied to other types of media, including documents (e.g., through subtle line, word or character shifting), software, multi-dimensional graphics models, and surface textures of objects.

For software, a serial number or a CD key is embedded into the code of a software application.

For music protected by watermark technology, an imperceptible digital watermark signal is embedded in the host content. In fact, robust watermark systems have been developed in order to even be persistent with content quality degradation (compression, analog recording,). However, according to Professor Edward Felton of Princeton University, all the watermarks techniques have been or can be broken. I has been shown that, if some imperceptible signal is introduced into the content, it is possible to disturb or remove the signal without altering the quality of the perceptible content. Professor Felton further indicated that in theory, a good psycho perceptive compression could remove a watermark from a watermarked file without altering the perception of the content.

The solution to the problem of piracy is extends beyond content codification. To continue to ensure that the media industry continues to generate revenue by controlling the duplication and distribution of their products, the media industry must actively seek out solutions to address the problem of piracy. Currently, thanks the proliferation of computer hardware and software in the duplication, processing and communication arenas, the media industry is losing its monopoly on the duplication and distribution of its products.

What is needed is a system and method of creating and distributing works of art that takes advantage of the possibilities of duplication and distribution offered by modern computing and telecommunication, while preserving the rights of the authors

SUMMARY OF THE INVENTION

The present invention proposes a process for creating and distributing works of art to users, while protecting the rights of the authors. A work of art is any piece of information digitally encoded or available as an analog signal. An author is an individual or group of persons involved in the creation of an original digital work of art: By way of example only, an author may be a composer, writer, player, musician, engineer, producer, actors, singer, mixer, programmer, analyst or any other individual or group involved in the creation of a digital work of art. A user is any person or entity that received the right to use a digital work of art: By way of example only, a user may be a consumer, a DJ, a Movie theater, a radio station, a Television station or network, a promoter, or any other person or entity that will view, listen to or in any other way perceive the digital work of art.

In one simplified embodiment, a different version of the work of art is delivered to each user. Each version is slightly, yet perceptibly different in content. Therefore, each version is an original and unique or fixed work of art. Each version may then be delivered and assigned to a single user. Information identifying the features of each version and the associated user may be stored.

By later analyzing the content of a fixed or unique version and reviewing the stored version/user data, the user associated with a given version the user of a specific version can be readily identified. If a user illegally copied and distributed a fixed or unique version, the original user can be identified from the content of the fixed or unique version. The fixed version need not contain hidden tagging, watermarking or additional identification data. However in alternate embodiments, such tags, watermarks or additional information may be included in the fixed or unique version.

The identification information is the content of the version itself and therefore cannot be removed without degrading the content. Since the content of the work of art is different for each version, the author can provide limitation on the variations in the preparation of the multiple versions. However, in alternate embodiments, the author may not provide any guidance or limitations.

Various aspects of one embodiment of a system are described paragraphs, (a), (b), (c) and (d), below. However, various other embodiments are contemplated.

(a) An author creates a variable work of art that can be used to generate multiple versions. This variable work of art is a creation with a broader content than a classical work of art. In a variable work of art, the content is not completely determined, but prepared with some non-fixed options. That is, the variable work of art can contain specific locations in the content where the author will permit modifications or deviations from a the base work. However in alternate embodiments, the author may specify the entire content as being variable or any specific segment or segments of the content as being variable. This variable work of art is used to generate the multiple versions of the work art for distribution.

(b) From the variable work of art described in above, a plurality of different, fixed versions can be automatically generated. The content of each fixed version is perceptibly different for all other fixed versions in at least one place. In this way, each generated version is unique. Generally, the fixed versions are generated in such a way that removal or modification of the perceptible difference in each version would degrade the content of the fixed version. However, in alternate embodiments fixed versions can be generated such that removal or modification of the perceptible do not substantially impact the content of the fixed version. In one embodiment, generation of a fixed version can occur at the time a user requests a version.

(c) After generation of each fixed version, the rights for each unique version can be assigned and/or delivered to one or more users. In one embodiment, each fixed version can be assigned and/or delivered to only one user. In the one-fixed-version-one user embodiment, each fixed version is reserved for private use by the assigned user. In one embodiment, each unique version is delivered to the assigned user via any convenient method. In an alternate embodiment, a record of each delivery can be kept in a rights management database. The database can contain information sufficient to identify the delivered fixed version and information identifying the user associated with the specific fixed version.

(d) To identify unauthorized distribution of a fixed version, publicly available data sources such as Internet transmissions, Web sites, Peer-to-peer networks, Intranets, company networks and the like can be scanned to determine if a previously assigned fixed version is being transmitted or is located on a system. From the content of the fixed version, unique characteristics can be extracted and compared to the characteristics of fixed versions stored in a database. When the version is identified, the assigned user of a fixed version can be identified.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Figure 1:
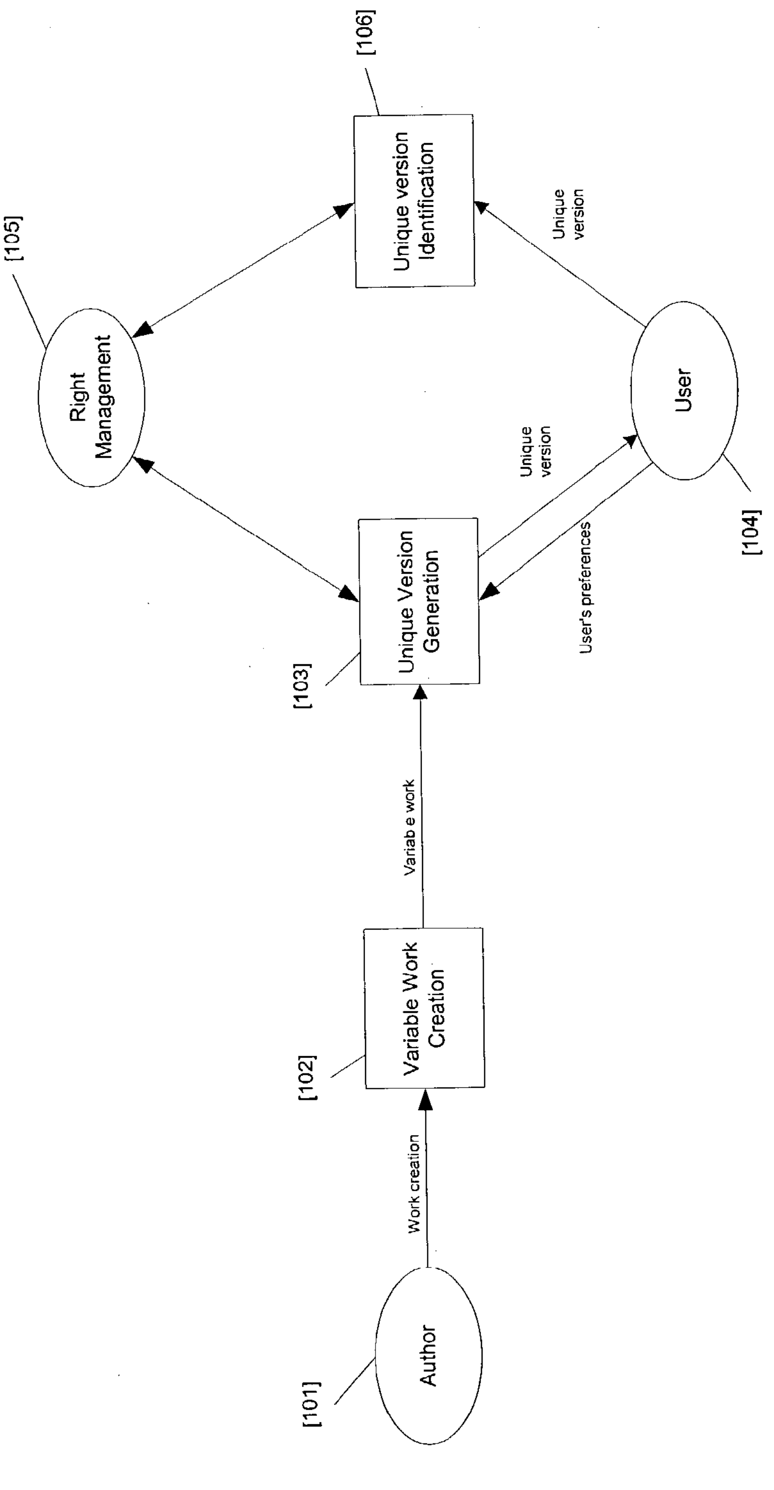
FIG. 1 is a simplified overview of the a fixed version generation system and associated components.

FIG. 1 shows an overview of one embodiment of a method implemented by the present invention. In the embodiment shown in FIG. 1, an author [101] can create a variable work of art. A variable work of art is a creation that has a broader content than a classical or fixed work of art. The content of a variable work of art is not completely determined, but contains open options. That is, a variable work of art includes places in the content where multiple possibilities are available. In alternate embodiments, any portion of the variable work of art may contain multiple available options. The creation of a variable work of art is accomplished through the variable work creation process [102].

In the embodiment shown in FIG. 1, once a variable work of art exists, multiple fixed or unique versions of the variable work of art can be generated from it either automatically or on demand. The step of generating unique works of art from the variable work of art is the unique version generation process [103]. In the embodiment shown in FIG. 1, the generation of a unique version is performed in response to a user [104] request for a copy of the work of art. However in alternate embodiments, multiple unique versions may be generated without a user request. The generated unique versions are "copies" of the variable work of art in which the variable portions have been uniquely fixed. Thus, the generated unique versions are classical work of arts, in which the content is completely determined. In the embodiment shown if FIG. 1, the differences between two unique versions are perceptible and the unique versions are generated in a manner such that the removal or modification of the unique differences would degrade the content of the work of art. In the embodiment shown in FIG. 1, each generated version is unique. That is, no two versions are ever fixed the same way, so that the contents of any 2 unique versions is never the same. Additionally, in the embodiment shown in FIG. 1, user [104] input can be used to specify preferences for some characteristics of the unique version or the unique version can be generated without any user input.

In the embodiment shown in FIG. 1, when a unique version is generated it is delivered to a single user [104]. Thus, each unique version is reserved for the use by a single user. However in alternate embodiments, a single unique version may be delivered to multiple users [104]. In the embodiment shown in FIG. 1, the unique version is delivered via a secured digital communication method. However, in alternate embodiments, the unique version may be delivered to a user in any convenient manner. In alternate embodiments this may include downloading the unique version via the internet, custom creation of digital or analog media or any other method for delivery of works of art known in the art. In the embodiment shown in FIG. 1, the communication is secured to ensure identification of the user and the safe delivery of the unique version.

In the embodiment shown in FIG. 1, a record identifying the user and the characteristics of the unique version associated with the user is stored in a rights management database [105]. This database can contain information on all unique versions that have been generated and the identity information for each user associated with a unique version. Thus, if the user improperly makes a unique version publicly available or improperly distributes a unique version via the internet, web sites, peer-to-peer networks, intranets, company networks or the like, the user associated with the improperly used unique version can be identified by comparing the content of the unique version to the rights management database.

In one embodiment, networks can be continuously or periodically scanned for publicly available or publicly distributed works of art. The contents of discovered works of art can be analyzed through the unique version identification process [106] and the users associated with any improperly available unique versions can be identified. In the embodiment shown in FIG. 1, the unique version identification process compares characteristics of the content of discovered works of art with unique version and user information available in the rights management database [105]. If a match between a discovered work of art and a unique version is found, the user associated with the unique version can be identified.

Figure 2:
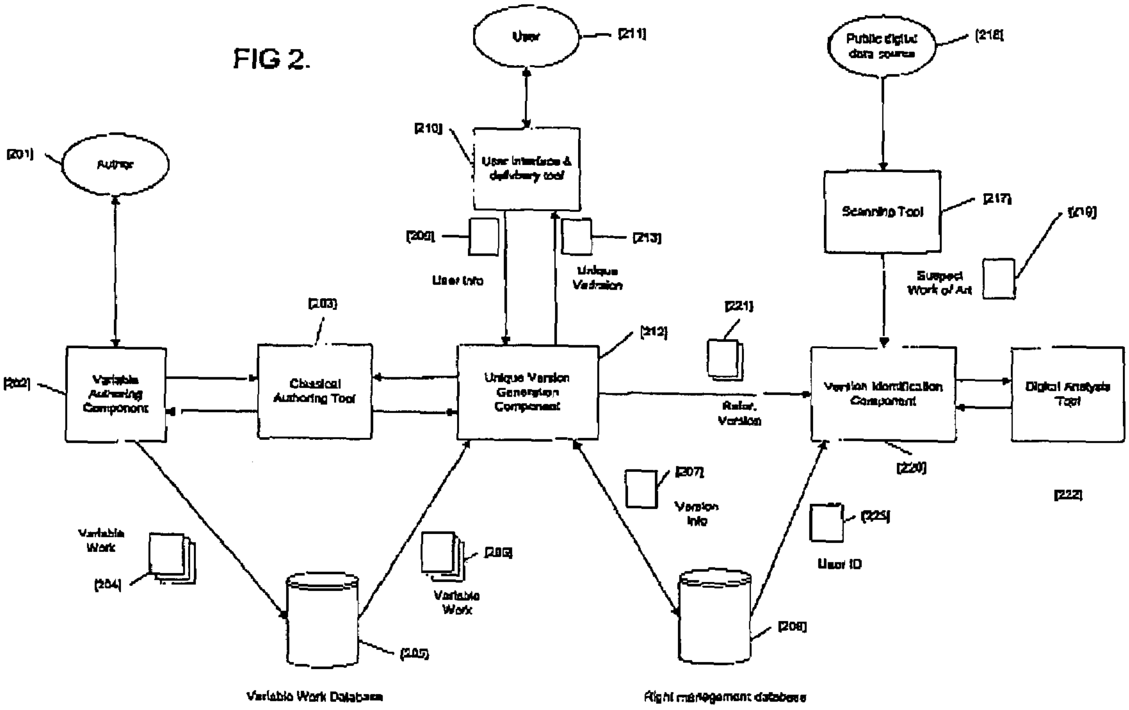
FIG. 2 is an schematic representation of the tools and components used to generate and distribute fixed versions.

FIG. 2 shows the components and tools used to implement one embodiment of the present invention. In the embodiment shown in FIG. 2, an author [201] creates a variable work of art by using the variable authoring component [202] and a classical digital authoring tool [203]. There are numerous authoring tools that are able to handle data of any kind such as music, movies, books, software, drawing and the like. These authoring tools allow an author to create a fixed work of art. To specify variable parts within the authors variable work of art, additional software or hardware components can be added, such as a variable authoring tool [202], which allows the author to establish limitations on part and attributes of the variable work of art that can be modified [206]. Once the variable work of art is completed, it may be stored in a storage medium [205] for later retrieval and/or use. In the embodiment shown in FIG. 2, a commercially available database tool is used to store the variable work of art. However, in alternate embodiments, any searchable data structure may be used.

In the embodiment shown in FIG. 2, to publish the work of art, a selection interface is presented to the user [210]. In one embodiment, this interface can be an application that identifies the user [211] and allows the user to specify various attributes of the variable the work of art [204]. This interface can be achieved using various available content management software applications which can be deployed over the internet, an intranet network, or various other software or hardware combinations. In one embodiment, when a user [211] requests a "copy" of the work of art, a unique version of the variable work of art [213] is generated. To generate the unique version, information regarding the variable work of art, previously generated unique versions and the user are obtained. Once the information is compiled, generation of a new unique version is commenced with the aid of a classical authoring tool. With this information, the unique version generation component [212] can fix variables parts and attributed within the content and generate a unique version [213], with the help of a classical authoring tool [203]. As with the creation of the variable work of art, the authoring tool can be a standard work of art authoring tool known in th art. In one embodiment, the authoring tool can be configured such that it can generate unique version automatically either with or without human intervention.

In the embodiment shown in FIG. 2, a version generation component [212] initiates the generation process with the determined fixed values for the variable parts and attributes of the variable work of art. Once a unique version is generated, the unique version is delivered to the user [211] through a delivery tool [210]. In the embodiment shown in FIG. 2, the delivery tool delivers a digital version of the unique version of the work of art to the user. However in alternate embodiments, other delivery methods are contemplated, such as custom generation, via a hardware component, of a tangible product, such as a CD, video cassette or the like, that may be delivered to the user. In the embodiment shown in FIG. 2, the delivery function is handled by the content management software. However in alternate embodiments, the delivery function may be handled by a separate delivery tool.

In the embodiment shown in FIG. 2, the version generation component [212] can store the selected attribute values for the unique versions into the rights management database [208].

For the detection of improperly publicly available works of art, a retrieval tool [219] may be used to retrieve the suspected versions [219]. The retrieval process depends on the type of work of art and the digital data source of the work or art. In the embodiment contemplated in FIG. 2, the data source would be the internet, an intranet or a company network. However, various tools known in the art may be used to search other sources of improperly available works of art. The embodiment described with regards to FIG. 2 relates to searching sources such as Web bots and Peer-to-peer applications. The scanning tool [217] can continuously or periodically scan the publicly available digital data sources [218] to locate publicly available works of art. In the embodiment shown in FIG. 2, suspect works of art [219] that are found can be sent to the version identification component [220]. This component can use reference versions [221] and/or reference attribute data from the unique version generation component [212] to determine if the suspect version is being improperly distributed. A reference version is a generated version that is not delivered to a user, but that is used internally by the present invention to serve as a reference when analyzing and comparing unique version contents. In alternate embodiments, the version identification component [220] can also use content analysis tools [222] to uniquely identify a unique version.

If a suspect work of art is identified as having attributes matching a unique version contained in the rights management database, the version identification component [220] can retrieve the identification information for the user that the unique version was originally distributed to.

Figure 3:
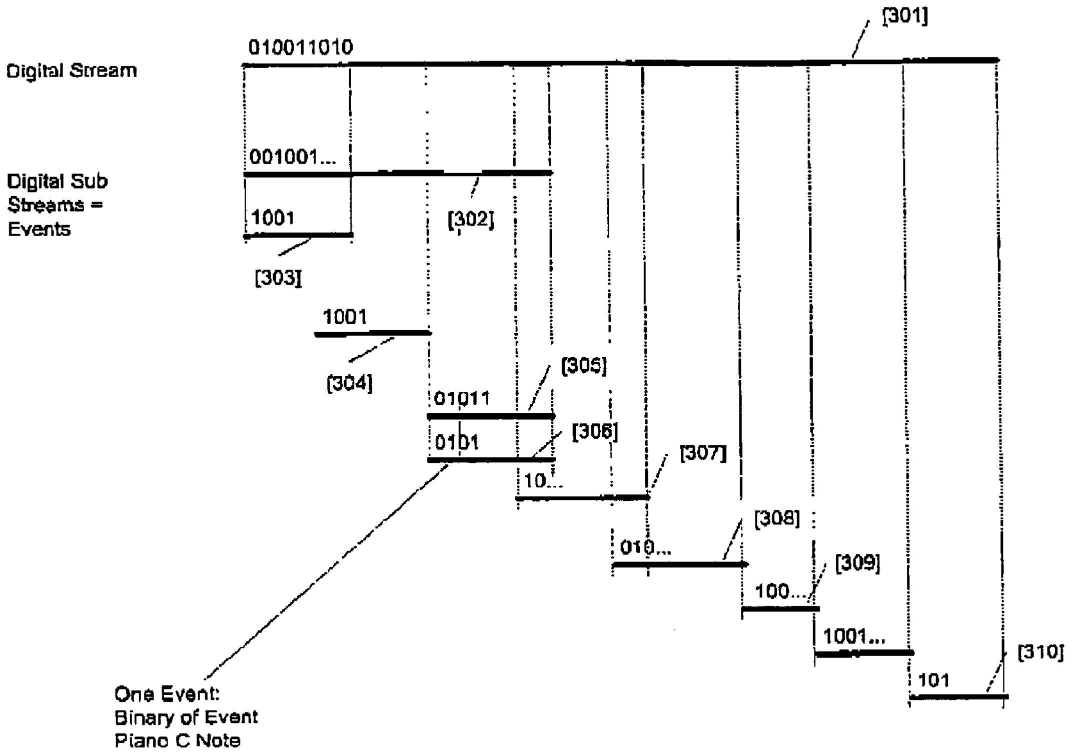
FIG. 3 is a diagram showing the stream of events contained in a digital work of art.

FIG. 3 is a generic representation of digital content that may be contained in a digital work of art. This diagram is provided by way of example only for better understanding of the nature of a variable work of art. In alternate embodiments, the work of art may be in any other convenient form; The present example is given for a music content, however, the same description can be applied to any work of art.

An author creates a work of art by defining its content. The content of a digital work of art is a continuous binary stream (for example a music song in .WAV format) [301]. This binary content is generated by the assembly and combination of multiple binary sub-streams [302–310] in known manners (combination might be a complex process that involves transformation of the streams: for example in a software application: the source code compilation). Each sub-stream can be seen as the digital representation of an event (for example the note C played on a piano [306]). Each event results from the creative action of the author. Each event possesses one or more attributes [311] that totally characterize the event—for example, the length of the note is an attribute of the event of the note C being played on a piano. Different types of events have different values. Each attribute has a corresponding value [312] (for example: 1.2 second for the length of the note C played on a piano).

In classical digital authoring, the author fixes all values for all attributes of all events in his work of art [312]. Therefore, the content of the author's creation is fixed. The present invention allows the author to select multiple possible values [312–315] for some or all attributes, instead of requiring the author to fix all attribute values. Thus, the work of art can have multiple variations based upon how the attributes of the variable are fixed. By combining the values of the different attributes, multiple versions of a work of art can be generated.

To preserve the coherence of a work of art, logical links between values of attributes of events can be defined (for example: all piano note should be played 1.2 sec). These links can establish a dependence between values depending on how much variability the original author would like to leave in the work of art. Logical links can also tie together values of different attributes [316] (sustain only if piano note is shorter than 1.2 sec.). In fact, links can be very generic relationships between values that can be used to maintain coherence of the variable work of art and the unique versions by preventing conflicting attribute values from being assembled. The links are constraint for the selection of valid values and therefore decreases the number of generated versions. Thus, the greater the number of links, the fewer the number of unique versions can be generated from a variable work of art.

Figure 4:
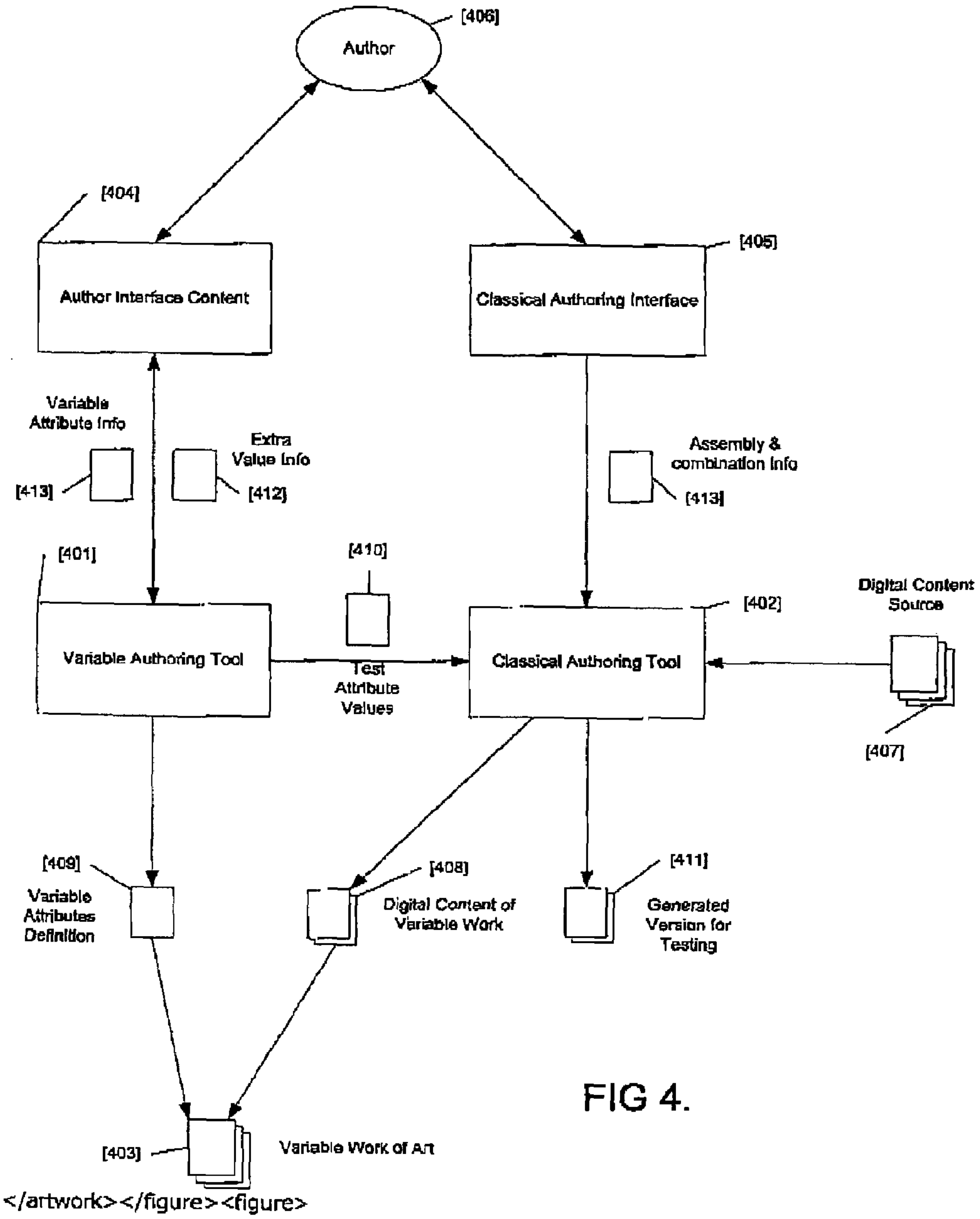
FIG. 4 is a schematic diagram showing the components used by an author to create and test a variable work of art.

FIG. 4 depicts the variable work creation component. In the embodiment shown in FIG. 4, the component [401] works with a classical digital authoring tool [402] to produce a variable work of art [403]. There are numerous authoring tools that are able to handle data of any kind: Music, movies, books, software, drawing and the like. In the embodiment shown in FIG. 4, the authoring tools present an interface to the author to help him assemble the individual pieces of the work of art.

Classical authoring tools only allow an author to create a fixed work of art. In the embodiment shown in FIG. 4, author [406] interfacing is conducted through a specific interface [404] for control of the variable parts of the work of art and a classical interface [405] for the control of assembly and combination [413] of the various components.

In the embodiment shown in FIG. 4, for generation of the variable work of art, the content source [407] is managed by the authoring tool [402] which will select, transform, arrange and/or combine the content to prepare the combined variable work of art [408]. However, at least since some events have variable attributes, the assembly is not finished. In one embodiment, the author [406] encodes the variable content attributes and can provide ranges for possible values [413] through the variable content interface [404]. Additionally, the author [406] can also encode the logical links between values (for work of art coherence) through the interface [404]. However, in alternate embodiments, the author may leave all attributes independently variable.

All the variable attribute information is stored into a variable attribute definition [409]. The content of the combined work of art [408] (unfinished assembly) and variable attribute definition [409] makes together the variable work of art [403] that can be stored.

For testing purposes, in one embodiment, the variable authoring component [401] can produce sets of test values [410] for variable attributes. The test value sets can be used to generate unique versions [411] through the classical authoring tool. The author [406] can use them to test and validate the selections of the variable values.

In another of embodiment, the author [406] can add complementary information to the variable selection [412]. This information can characterize the possible values [413] and can be used to help the user specify his preferences (user preference are choices the user can make about the work of art that will be generated for him).

In yet another embodiment, the authoring component [401] can compute, in real time, the total number of versions that can be safely generated from the current set of variable attributes [403] and provide this information to the author. In another embodiment, this information is displayed to the author [406] through the variable content interface [404], thus providing the author some feedback during the variable work of art creation process.

In a still further alternate embodiment, the author [406] can establish a limit on the total number of versions that can be generated. This information is saved as part of the variable attribute definition [409]. In this manner, the author can limit the total number of copies of a given work that are distributed.

Figure 5:
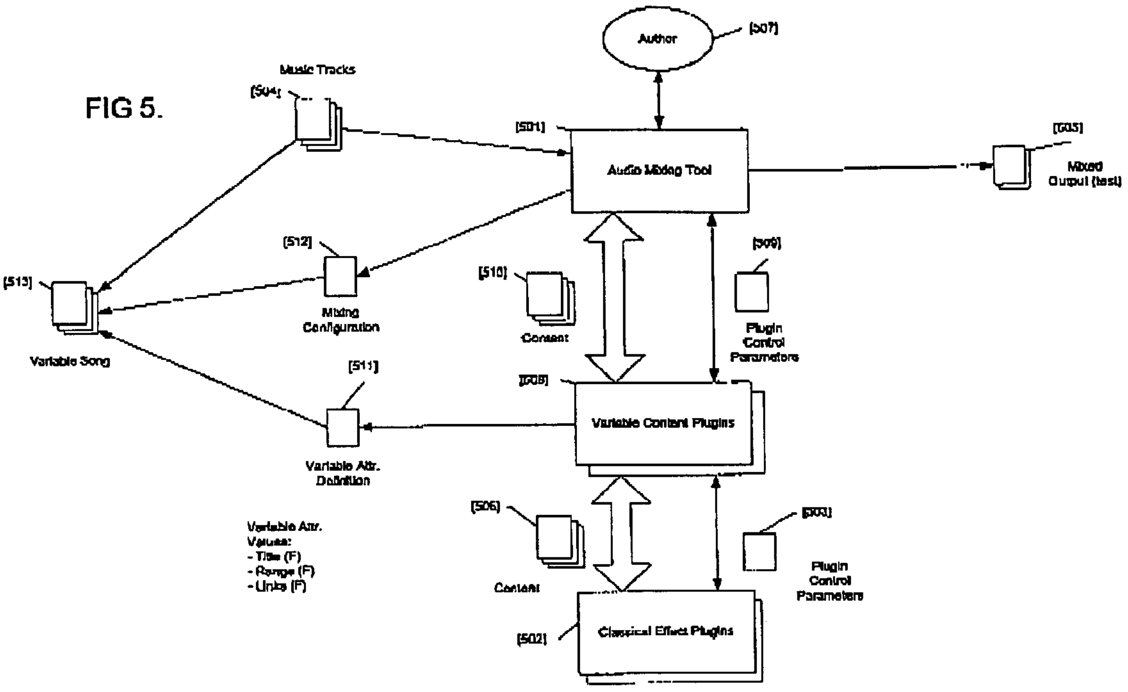
FIG. 5 is a diagram showing an embodiment of a creation component for a variable work of art.

FIG. 5 depicts an embodiment of the variable work creation component applied to digital music. In the configuration shown in FIG. 5, a classical audio mixing tool [501] is used. In the process of creating a musical work of art, the components of the work are recorded on separated tracks (voice on one track, drums on another, . . . ) and a classical audio mixing tool [501] is used to combine and arrange the recorded tracks of the song [504]. This process is called mixing and is the last step in the creation of a classical musical work of art. In one embodiment, the mixing device can be a software application. The mixing tool can take musical tracks [504] as input and generate mixed content [505] as an output. The author [507] can control the parameters of the mixing tool [501] to achieve a desired result.

In one embodiment, the mixing parameters can be recorded by the tool [501] into a mixing configuration file [512]. The mixing configuration file contains information regarding the way tracks are to be combined.

During the mixing process, the mixing tool allows content transformation through effects plugins [502] which are designed to modify the resulting product. An effect plugin can be a software or hardware sub-component that is utilized by the mixing tool. It is designed to receive the content [506] of one or multiple music tracks (channels) from the mixing tool [501], to modify the content and to return the transformed content to the mixing tool [501].

In the embodiment shown in FIG. 5, the content [506] transferred to and from the plugin is simply the digital representation of the track. A very wide range of effects plugins can be used (volume, tone, panning, delay, echo and others). The plugins are parameterized and exchange control parameters information [503] with the mixing tool. Thus, the author [507] is able to control the plugins by changing the control parameters in the mixing software application [501].

The control parameters [503] can be seen as attributes of the content [506] processed by the plugin. Thus, in one embodiment, the variable authoring tool [401] can be implemented as multiple plugins [508] where the plugins can be installed between the audio mixing tool [501] and the classical effect plugin [502]. The mixing tool may not be aware of the presence of the classical plugin [502] as the mixing tool may only interact with the variable content plugin [508]. Each plugin [508] may rely on the corresponding plugin [502] for all the content [510] processing or may operate independently.

In generation of the variable work of art, the controls parameters contain the classical plugin control parameters [503] plus extra information to define the range of accepted values for the classical parameters [503] (attribute values). The extra parameters are presented to the author [507] as standard plugin parameters. The extra parameters define the identification of the controlled plugin [502], the range of allowed values, the links between values (for musical coherence) and the time at which the variables should change (variable attributes definition [FIG. 4: 409]). More generally, the variable content plugin [508] changes the parameters of the controlled classical plugin [502] according to the desired attribute variation. Examples of attributes (parameters) definitions are:

Volume variation—The author [507] defines a range of volume values for the track (−90 dB, +2 dB, by steps of 2 dB). In one embodiment, the value can change over time as a function or randomly.

Panoramic movement—The author [507] defines a track position. The track is split into different output tracks by the plugin [502]. The groups of values are the relative % of the sound that goes to each output track. In one embodiment, the values changes overtime to generate movement function or randomly.

Tuning—The author [507] defines a range of tune variation values (+10%, −10%, increments of 1%) that the plugin [502] will apply to the track. In one embodiment, he value can changes over time as a function or randomly.

3D. During the creation, the author defines a 3D zone where a track can be placed. As for Panoramic movement, the track is split by the plugin [502]. The values define a window of possible positions for the track. In one embodiment, the panoramic effect can be designed to move in accordance with a function or randomly.

Sound dropping—The author [507] defines different positions where a sound (sample) could be played as well as the number of times the sound should be played. When needed, the plugin [502] is ordered by the plugin [508] to drop a sound into the content [506]. Additionally, in one embodiment, a sample may be added to the content in accordance with a function or randomly.

Example of linked values:

In an alternate embodiment, the author [507] can define a set of exclusive tracks. The tracks can be switched at different positions (cross points) during the generation of a unique version. For each cross point the author can define parameters for the crossover method. Additionally, the involved plugins [502] can have exclusive volume parameters.

The parameters for generating unique versions can also be defined by function calls. When the author [507] records valid mixing configuration, the extra parameters are saved into a file [511]. This file represents the variable attribute definition [FIG. 4: 409]. This information grouped with the original music track [504] and mixing configuration information [512] makes the variable song [513].

For testing purpose, the author [507] can generate temporary unique outputs [505] utilizing the function calls. In another embodiment, the author can lock the values of variable attributes to be able to listen to a generated test version [505] multiple times.

In yet another embodiment, the author [507] can characterize the combinations of plugin [502] parameters that will generate a particular type of version (For example 'cooler' music is achieved with lower value on volume parameter for drums). This information is saved into the parameter file [511].

Figure 6:
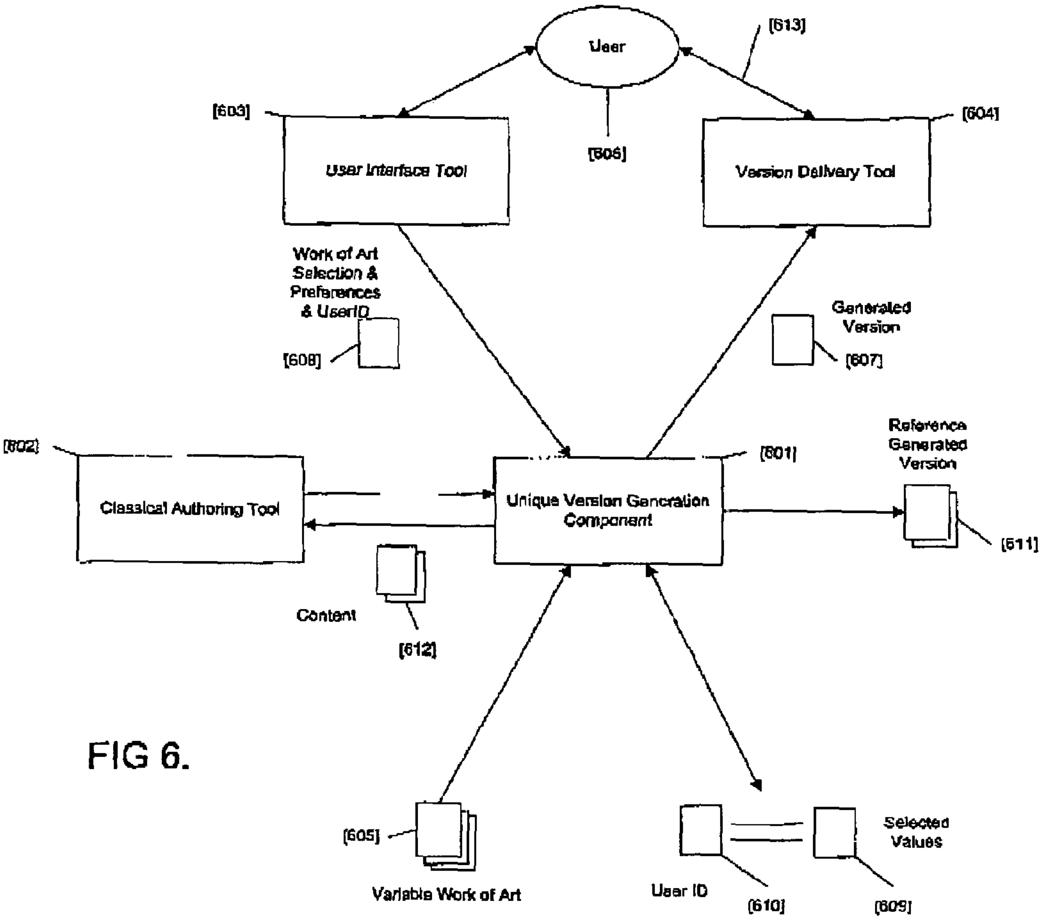
FIG. 6 is a diagram showing a component for generating a fixed version from a variable work of art.

FIG. 6 describes the unique version generation component. In the embodiment shown in FIG. 6, the unique version generation component [601] works in conjunction with a classical authoring tool [602], a user interface tool [603] and a version delivery tool [604]. However, in alternate embodiments, the unique version generation component may function independently.

In the embodiment shown in FIG. 6, the unique version generation component [601] transforms the variable work of art [605] into a user [606] specific unique version [607]. Once a unique version is requested, the authoring tool [602] assembles the various parts of the variable work of art and fixes attribute values to generate a unique version.

In the embodiment shown in FIG. 6, the user interface [603] is a software application that permits the user to request a "copy" of the work of art and specify a limited number of values for some attributes. In one embodiment, this tool could be an content management tool deployed over Internet. However, in alternate embodiments this tool may be any convenient hardware or software device or a program.

In the embodiment shown in FIG. 6, the delivery tool [604] is a software application that will be used to deliver the generated work of art to the user. In one embodiment, this would be a service provided on internet. However, as described above various distribution methods are contemplated, such as custom generation, electronic delivery and web access to the unique version without the ability to download it.

As shown in FIG. 6, a user [606] requests a "copy" through the user interface tool and provide identifying information about him or herself. Additionally, the user may provide preferences with regards to attributes that will be included in the user's unique version. The request and identifying information together with any user preferences [608] are passed to the generation component [601]. The component [601] retrieves the variable work [605] and selects attribute values for the generation of a unique version [607] that will generate a unique version that conforms with the user's preferences, if possible.

For all the variable attributes, the values are chosen and combined so that:

1. the values of attributes used in the unique version fall within those selected by the author for those attributes 2. the values of attributes used in the unique version respect the defined logical links between values 3. the values of attributes used in the unique version provide sufficient difference form previously generated versions 4. the values of attributes used in the unique version provide a protection against the removal of the uniqueness of the unique version.

5. The values of attributes used in the unique version correspond, if possible, to the user's choices (user preferences)

Items 1 and 2 are accomplished by re-using the information about variable attributes provided in the variable work of art [605].

Item 3 is attained by choosing different attributes for each generated version. The number of differences is maximized with respect to the number of versions that will be generated. The component [601] uses the list of already generated versions [609, 610] for this work of art [605]. That information is coming from the right management database [FIG. 2: 208].

Item 4 is provided by an algorithm of the generation component based on intertwined attributes links and the perceptibility of the differences.

Item 5 is reached by using user preferences [608] if received through the interface tool [603].

Once the a value set for the attributes is selected, the corresponding binary sub-streams [612] are computed with the help of the authoring tool [602] and combined into the final content [607] or unique version. In the embodiment shown in FIG. 6, this generation happens automatically, without the need for the author intervention. However, in alternate embodiment, an intermediate review step may be included prior to generation of the unique version.

In the embodiment shown in FIG. 6, each generated versions [607] is different, yet logically coherent and in line with the author's choices. That is, each version is an original work of art. Once a version [607] is generated, a 1 to 1 link is made between the identification of the user [610] and the selected attributes of the generated version [609]. This information can be used to find a user from a version or vice versa. This information is stored in the right management database [FIG. 2: 208] for later use.

Although the system described above details a one-to-one, relationship between unique versions and users, in alternate embodiments, more that one user may be assigned to a single unique version.

The unique version generation component [601] also generates reference versions [611] to be used in the identification processes (A reference version is an internally generated version used as a reference when analysing and comparing version contents)

In another embodiment of the present invention, all the versions [607] are generated in advance. The user [606] will only choose a version from the still available version list presented in the user interface tool [603].

In another embodiment, only some of the variations of the work [605] are fixed. In this case, the generated version [607] is still partially variable. The user [606] can then generate more versions from delivered version [607]. In that case, the unique part of the generated version must carefully respect the identification constraints to retain its uniqueness.

In another embodiment, a version [607] can be regenerated in case the version is lost by the user [606] or during the communication process [613]. This regeneration process uses the stored selected values [609] of the original version [607]. The regenerated version is exactly the same as the lost version. This characteristic is an advantage over encryption systems that do not allow multiple deliveries of the work of art.

Figure 7:
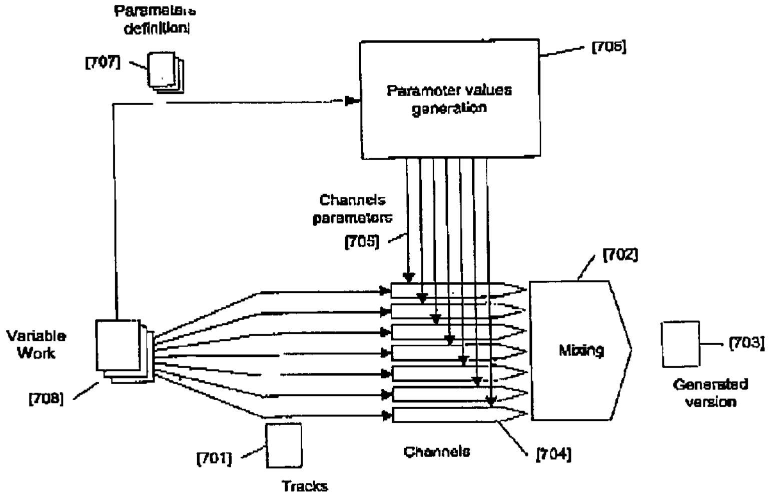
FIG. 7 is an overview of a version generation component applied to work of art.

FIG. 7 shows an overview of the version generation component applied to digital music. In the music environment, the last step in the creation of a song is the mixing process. Each component of the song is recorded on a different track [701]. To generate the final song [703], the tracks are combined in a process called mixing [702]. Just before being combined, each track goes into a channel [704] where its content can be transformed (volume, delay, pitch or any other transformation). In the embodiment shown in FIG. 7, the way transformations will be applied on in a channel is defined by one or more parameters [705]. The parameters can take a range of values (for example 0 for no transformation to 10 for maximum transformation). For each of those values, the output of the channel [704] is different, so is the generated song. This process is handled by all the existing mixing tools used in the music industry. The present invention adds to this process a parameter generation component [706] that will generate values for the channel parameters. Thus, in one embodiment, the generated values can be different for each generated version [703]. This parameter generation process will respect the range of possible values for the parameters [707] that have been defined by the author in the variable work of art [708]. In one embodiment, the parameter value generation component can respect the 5 rules defined in the description of FIG. 6. However, in alternate embodiments more, fewer or no rules may be specified.

Figure 8:
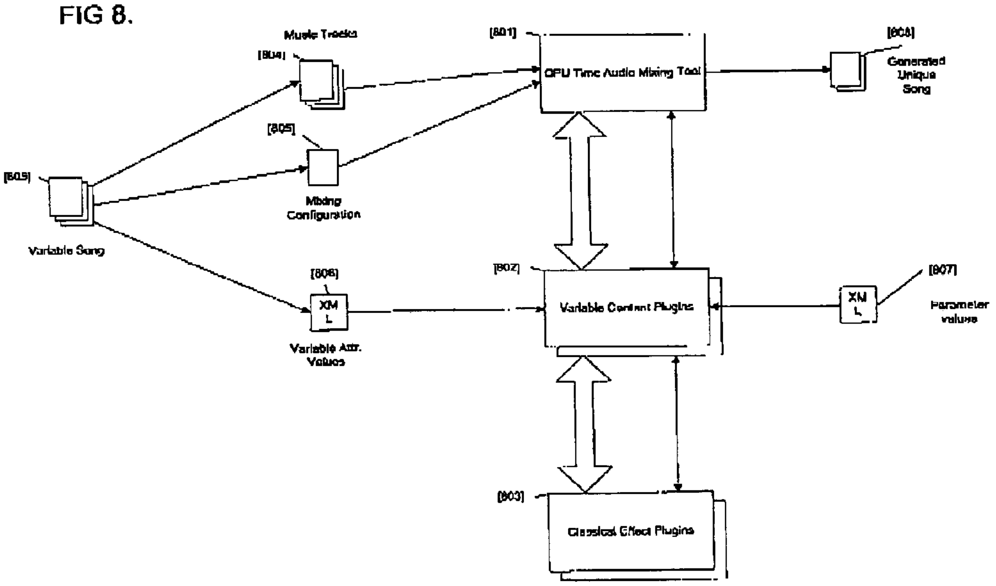
FIG. 8 is a diagram showing an embodiment of a version generation component for a musical work of art.

FIG. 8 shows an embodiment of the version generation component applied to digital music. In the configuration shown a 'CPU time' audio mixing tool [801] is used. Mixing tools are used by authors to create their works of art, since the author can listen to the result of the mixing, mixing process happens in 'real time'. That is, the execution speed is matched with the speed of music playback.

In the embodiment shown in FIG. 8, for the unique version generation, listening to the result is not needed (no one is listening-however, in alternate embodiments, the unique version may be reviewed prior to delivery), but the version must be mixed in an expedited manner, for a faster delivery. This kind of mixing is called CPU time mixing because the mixing process happens at the maximum speed the CPU is capable of processing the information.

There are multiple audio mixing tools that provide CPU time processing functionality that are known in the art. The architecture for unique version generation is similar to the plugins [802, 803] architecture found in FIG. 5, with the difference that the plugins will also work in CPU time. With this configuration, the variable song [809] components are split to provide the music tracks [804] and the mixing configuration [805] to the mixing tool [801], and the mixing configuration [805] and the variable attribute definition [806] (extra parameters from the creation process plugin [FIG. 5: [508]) to the plugin [802].

Furthermore, the parameter values [807] inherent to the currently generated version are provided to the plugin [802]. The output of the mixing tool is the desired generated version [808]. This process can be invoked either to deliver a user version or a reference version (internally generated version used when analysing and comparing version contents). In the embodiment shown in FIG. 8, the parameters [807] are provided by the invoker. However in alternate embodiments, the parameters may be internally generated.

Figure 9:
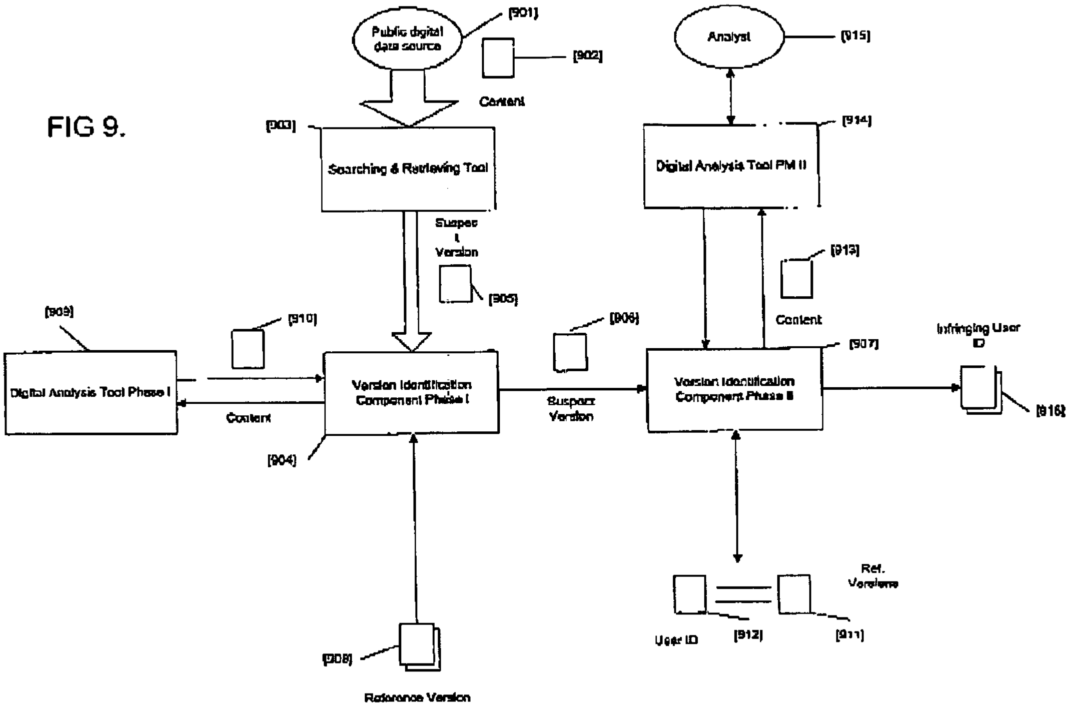
FIG. 9 is a diagram depicting a dual phase identification component for fixed or unique version and/or user identification

FIG. 9 shows the version identification component. The actual data sources (internet, intranet, company networks, and the like) [901] are excellent media for exchanging information. Furthermore, searching and retrieving tools [903] (like peer-to-peer systems) allows easy publication of works of art. Since those system [903] tend to provide more and more anonymity, it will soon be impossible to know the source of an exchanged work of art. However, by retrieving works of art [902] through those systems [903] and by analysing their content and comparing the retrieved works of art with the attributes of unique versions [FIG. 6: 607] stored in the rights management database [FIG. 2: 208], the identification information of the associated user [FIG. 6: 606] can be found.

In one embodiment, the analysis of suspect digital works of art is conducted in 2 phases. Phase I [904] roughly analyses the binary stream (content) of a suspected work of art [905] provided by the scanning tool. The content is checked to determine if it could correspond to a group of unique versions, but not to find a specific version. In one embodiment, phase I [904] is an automated process that is conducted by a high speed processor and is fast.

Phase 1 selects possible candidates [906] for a second phase analysis based on comparison with references version [908]. A reference version is a version generated with neutral values and used as a reference when analysing and comparing version contents. A variable work of art can have a plurality of reference versions [908]. The analysis and comparison can be performed with the help of a digital analysing tool [909] that is able to extract meaningful information from a digital content. In one embodiment, a specific digital analysis tool can be adapted to the kind of content [910] being analyzed.

The second phase analysis [907] analyzes the digital content [906] in much more details to identify the exact version that is being improperly distributed. Attribute values associated with actual delivered unique versions [911, 912] stored in the rights management database [FIG. 2: 208] are used in phase II. The analysis is eventually performed by more precise tools [914] and, in one embodiment, human intervention [915] is contemplated. Since a user ID [912] is attached to each version, once a version is clearly identified, the corresponding infringing user ID [916] can be found in the rights management database [FIG. 2: 208].

In another embodiment, can use a fingerprint tool to perform the version comparison [909, 914]. Fingerprint tools extract a short but very significant ID from the content. The IDs of reference versions [908, 911] can be rapidly compared to the IDs of suspect versions [905, 906].

Figure 10:
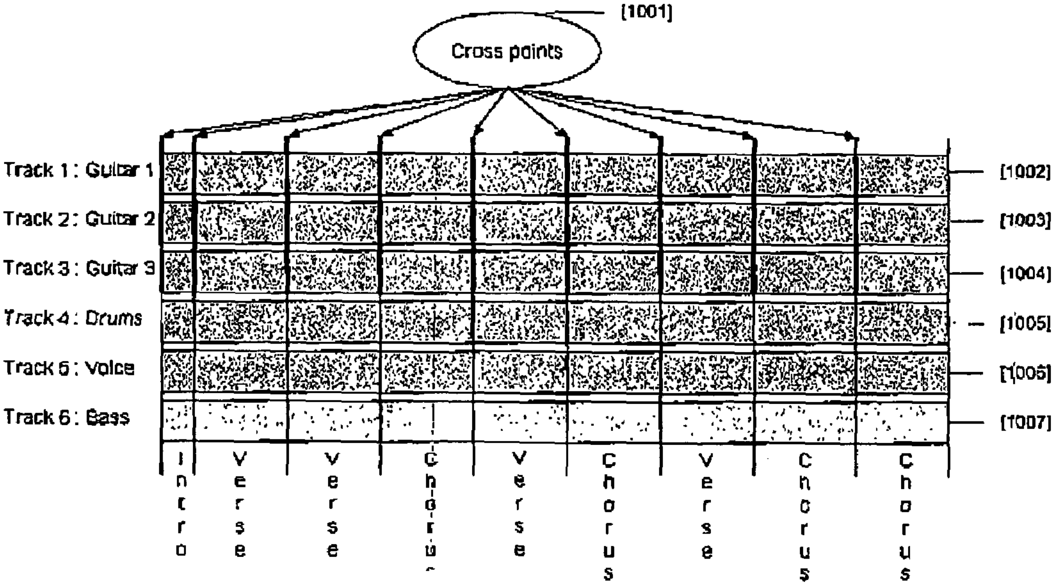
FIG. 10 is a diagram showing a simple example of a variable musical work of art.

FIG. 10 shows a simple example of the creation and usage of a variable work of art related to the music industry. The work of art is song entitled "Thank you"; the author is a famous American artist. The song is divided into one intro, two verses, one chorus, one verse, one chorus, one verse, and two choruses (separated by cross points [1001]). For the purpose of this example, the content of the song as been recorded on 6 tracks (numbered from 1 to 6):

1. Guitar 1 [1002]
2. Guitar 2 [1003]
3. Guitar 3 [1004]
4. Drums [1005]
5. Voice [1006]
6. Bass [1007]

Tracks 1 to 3 are three different recordings of the guitar. The other tracks are self-explanatory. At the time of mixing, variable effects plugins are added on the tracks. The configuration is done through the mixing application [FIG. 5: 501], with the variable content plugin [FIG. 5: 508]. According to the present invention, an example of variable attribute definition [FIG. 4: 409, FIG. 5: 511] for this song would be:

On track 4 (drums) a 'tuning' effect is applied. This effect is defined as variable by the author. The accepted values for the effect are values from −10% to +10% by increment of 1% (21 values: −10%, −9%, −8%, . . . , 9%, 10%).

On track 5 (voice) a 'volume' effect is applied. The accepted effect values are +5 dB, 0 dB, −10 dB, −30 dB, −¥ dB. This variation is defined as a user's preferences parameter (for example, the user could select −¥ dB to receive a karaoke version of the song).

On tracks 1, 2 and 3, a 'volume' effect is applied. The only accepted values for this effect are 0 dB and −¥ dB (Normal or mute). The values are linked so that only one track at a time has a volume of 0 dB. Thus, in one embodiment only 1 track of the 3 is played at any time. However, a cross point [1001] is defined at the beginning of the verse, chorus and intro (9 cross point). A those points, the values are allowed to changed. The result is that the Guitar is played randomly from each track (one track at a time). Possible groups of values are (track # at 0 dB) {1,1,1,1,1,1,1,1,1}, {1,1,1,1,1,1,1,1,2}, . . . , {3,3,3,3,3,3,3,3,3}. For this example, fixed position crossovers are used. The 6 tracks and the variable attribute definition, with their possible values, define the variable work of art [FIG. 4: 403, FIG. 5: 513].

When a version of the song is to be generated, the same mixing tool and plugins are used, but in CPU time. For this simple example, there are $21*3^9$=413,343 unique versions that can be generated from this variable work of art (Since the volume level for the voice is selected by the user, it is not taken into account for uniqueness). For the sake of this example, the parameter values generation [FIG. 7: 706] sequentially generate all the possible unique versions, numbering them from 1 to 413,343 and link the versions to the user numbers.

In an alternate embodiment, the algorithm used for the value generation is much more elaborate. When the values for the version are fixed, the song is generated, stored in a file and delivered to the user through, for example, the internet.

Figure 11:
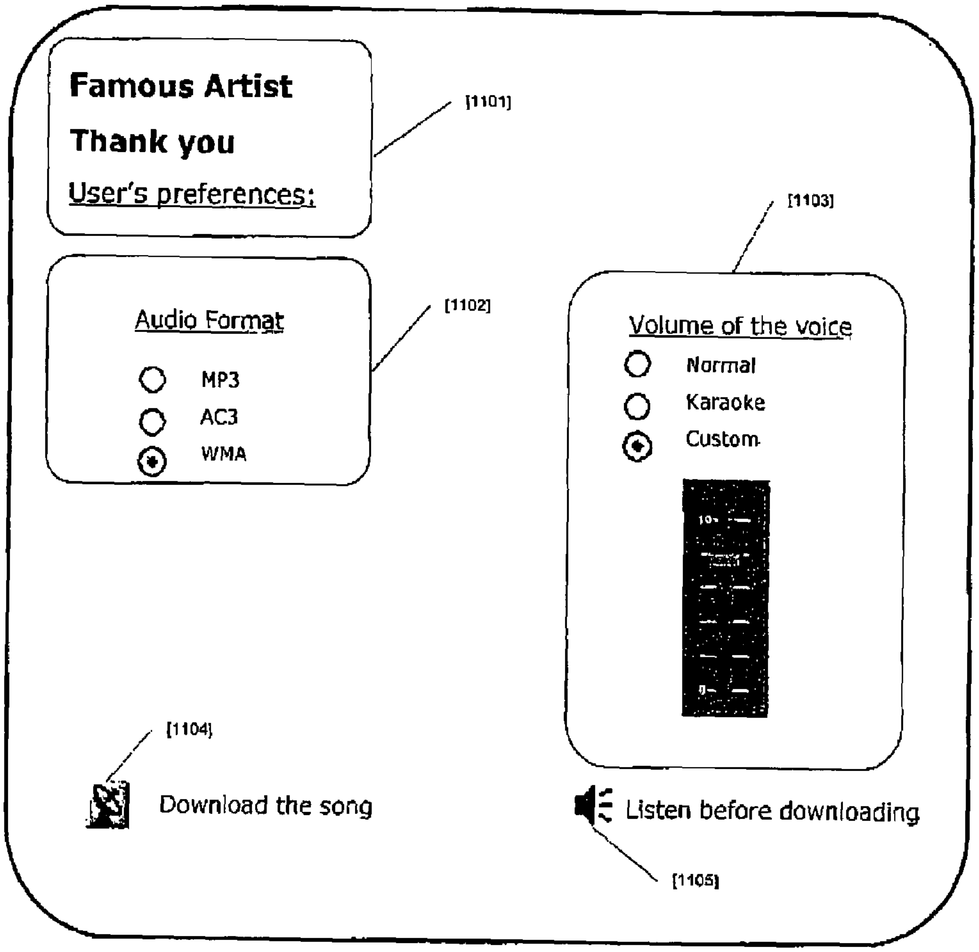
FIG. 11 shows a simplified example of user interface for the selection of a musical work of art.

FIG. 11 presents a simple example of a user interface for the selection of a musical work of art. In this example, an interface is shown to the user who want to download a song via the internet. Through this interface the user can view the selected song [1101]. The user has the opportunity to select the digital audio format [1102] of the song that will be delivered. Additionally, the user can select preferences about the volume of the voice in the song with the control [1103]. In alternate embodiments significantly more controls may be added that are related to specific variable attributes.

In the embodiment shown in FIG. 11, the user can preview the unique version by triggering the button [1105] to listen to a low quality version of the beginning or some other portion of the song. If the user is satisfied with the selection, the user can download the song by triggering the button [1104]. In one embodiment, at the time the button [1104] is triggered, the unique version generation tool is invoked with the parameters selected (volume level of the voice). The unique version is generated at that time and then the unique version of the work of art is delivered to the user.

In alternate embodiments, this user interface can be any convenient interface. In one embodiment, it may be a physical device directly associated with a CD burning device that can be used to create a custom CD containing the user's unique version. In alternate embodiments, the user interface may be virtual and implemented over the internet or any other convenient communication mechanism.

What is claimed is:

1. A method of generating a unique work of art comprising the steps of:

generating a variable work of art having at least one perceptible component;

modifying said at least one perceptible component of said variable work of art to create a first unique version from said variable work of art such that said first version is perceptibly different from alternate unique versions created from said variable work of art.

2. The method of claim 1 wherein the unique work of art is uniquely identifiable.

3. The method of claim 1 further comprising the step of: receiving user preferences;

wherein said step of modifying said at least one perceptible component of said variable work of art is performed in substantial conformance with said user preferences.

4. The method of claim 1, wherein said step of generating a variable work of art having at least one perceptible component comprises the steps of:

authoring a plurality of tracks of said variable work of art; and defining variable components within said variable work of art.

5. The method of claim 1, wherein said step modifying said at least one perceptible component of said variable work of art comprises the steps of:

defining at least one segment of said at least one perceptible component of said variable work of art; and altering humanly perceptible components of said at least one segment in a unique manner.

6. The method of claim 1 wherein said variable work of art includes parameters that restrict at least one portion of said variable work of art.

7. A method of generating uniquely identifiable works of art comprising the steps of:

receiving a variable work of art having at least one perceptible component;

fixing a portion of said at least one perceptible component of said variable work of art in a plurality of manners to generate a plurality of unique versions of said variable work of art, wherein each said unique version is perceptibly different from other unique versions.

8. The method of claim 7 further comprising the step of: distributing at least one of said unique versions.

9. The method of claim 8 wherein said step of distributing at least one of said unique versions comprises the step of:

converting said at least one unique version into a digital format.

10. The method of claim 9 wherein said step of distributing at least one of said unique versions further comprises the step of:

delivering said at least one unique version in said digital format over a network.

11. The method of claim 9 wherein said step of distributing at least one of said unique versions further comprises the step of:

magnetically encoding said at least one unique version on a magnetic storage medium; and delivering said encoded magnetic storage medium.

12. The method of claim 9 wherein said step of distributing at least one of said unique versions further comprises the steps of:

optically encoding said at least one unique version on an optically encodable medium; and delivering said encoded optically encodable medium.

13. The method of claim 9, wherein said step of converting said unique version into a digital format includes the step of encoding said at least one unique version in an MP3 format.

14. The method of claim 9, wherein said step of converting said unique version into a digital formal includes the step of encoding said at least one unique version in a .wav format.

15. The method of claim 8, wherein said step of distributing at least one of said unique versions comprises the steps of:

magnetically encoding said at least one unique version on a magnetic storage medium; and delivering said encoded magnetic storage medium.

16. A method of identifying a licensee of a work of art, comprising the steps of:

generating a list of humanly perceptible identifying features associated with at least one of a licensed work of art and a licensee;

receiving an identifiable work of art;

retrieving a least one humanly perceptible identifying feature from said identifiable work of art; and comparing said at least one humanly perceptible identifying feature of said identifiable work of art to said list of humanly perceptible identifying features to identify a unique licensed work.

17. The method of claim 16 further comprising the step of identifying a licensee associated with said identifiable work of art.

18. The method of claim 16 wherein said list of generating a list of humanly perceptible identifying features associated with at least one of a licensed work of art and a licensee includes the step of recording said list of humanly perceptible identifying features and licensee identification information prior to distribution of said work of art.

19. The method of claim 16 wherein said step of comparing is performed by a computer.

20. The method of claim 16 wherein said step of retrieving at least one humanly perceptible identifying feature is performed by a computer.

* * * * *